R. MACK.
ELECTRIC WELDING.
APPLICATION FILED FEB. 29, 1912.
1,143,220.
Patented June 15, 1915.
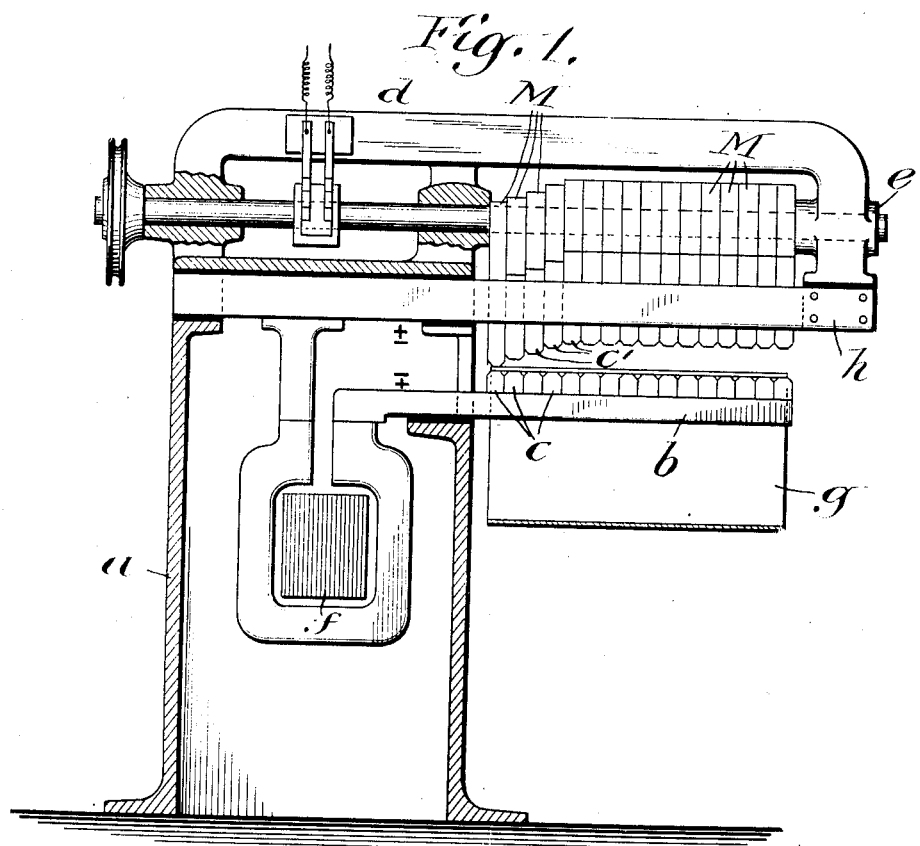
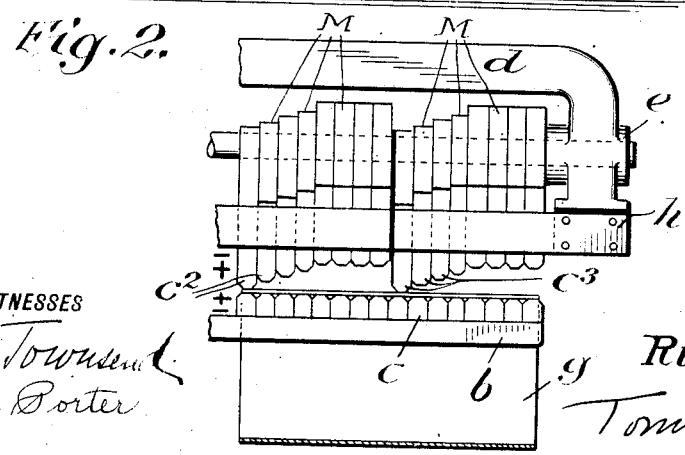
WITNESSES
F. B. Townsend
M. A. Porter
INVENTOR
Richard Mack
BY
Townsend & Decker
ATTORNEYS

UNITED STATES PATENT OFFICE.

RICHARD MACK, OF BERLIN, GERMANY, ASSIGNOR TO THOMSON ELECTRIC WELDING COMPANY, OF LYNN, MASSACHUSETTS, A CORPORATION OF MASSACHUSETTS.

ELECTRIC WELDING.

1,143,220.  Specification of Letters Patent. Patented June 15, 1915.

Application filed February 29, 1912. Serial No. 680,731.

*To all whom it may concern:*

Be it known that I, RICHARD MACK, a subject of the King of Wurttemberg, residing at Berlin, Germany, have invented certain new and useful Improvements in Electric Welding, of which the following is a specification.

This invention relates to improvements in electric welding and is particularly adapted for the welding of seams in sheet metal.

The main object of the invention is to simplify and quicken the process of electrically welding seams in sheet metal such as tubes, cylinders and other forms.

Another object of the invention is to simplify the operation of an electric welding apparatus adapted to weld seams whereby there will be a fewer number of parts required and therefore the cost of construction will be greatly reduced and the reliability of operation increased.

Heretofore in the electric welding of seams in tubes, cylinders and other objects of sheet metal it has been the practice to either point-weld the seam, that is weld it at a spot at a time, or to weld it by means of a continuous roller electrode. In either case, the object to be welded had to be carried past the electrodes by hand or automatically or else the electrode had to be passed over or along the seam to be welded. Both of these modes of operation led to many difficulties in construction, loss of time and consumption of electric power.

In accordance with this invention, which may be designated as a continuous point-welding operation, the above difficulties and objections are overcome as the object to be welded remains, during the entire process of welding, in a previously determined fixed position and the electrodes move only in a direction perpendicular to the welding seam.

The invention consists in the improved process of and apparatus for the electric welding of seams in sheet metal ware hereafter more particularly described and then specified in the claims.

The drawings illustrate two ways in which an apparatus or machine constructed in accordance with this invention works in carrying out the improved process.

Figure 1 is a diagrammatic view of an apparatus with which this invention may be carried into effect. Fig. 2 is a diagrammatic view of a portion of the apparatus shown in Fig. 1 and modified to cause the electrodes to be brought into operation in a slightly different manner.

Referring to the drawings $a$ indicates the main frame of the machine and upon which the parts are mounted. The transformer or transformers for supplying electric energy to heat the work is or are of the usual well-known type and may be of any desired number coupled together in a manner now well known in the art, the apparatus illustrated being provided with but a single transformer $f$.

Bars $b$ and $h$ projecting laterally from the framework $a$ and preferably parallel with each other form the terminals of the transformer, one being connected to each pole of the transformer secondary and furnishing current to the work engaging contacts or electrodes carried thereby in a well known manner. The arms $b$ and $h$ may be of any desired length according to the length or size of the object or material to be welded and are suitably insulated from each other and from the frame of the machine.

The lower arm $b$ is preferably provided with a plurality of work engaging electrodes or contacts preferably in the form of pins $c$ located in side contact with each other although if desired the lower electrode $c$ might be formed as a continuous strip. The arm $b$ and electrodes $c$ form a support upon which the work, as for instance a tube or cylinder $g$, is suitably clamped or held.

$c'$ indicates electrodes which move vertically in a slot in the arm $h$, from which they receive electric current from the transformer $f$. The electrodes $c'$ lie opposite and are equal in number to the electrodes or contacts $c$ on the lower arm $b$. The electrodes $c'$ lie in side contact with each other or in such close proximity that the weld caused by any one of them will overlap that of its neighbor to form a substantially continuous seam in the work $g$, located between the extremities of the electrodes $c$ and $c'$.

The electrodes $c'$ are caused to move in a vertical direction perpendicular to the work $g$ and into and out of contact therewith by any suitable means as for instance separate eccentrics M, actuated by a shaft $e$. The shaft $e$ is suitably mounted to rotate in the framework of the machine, the outer end being supported by an arm *d* and the shaft rotated by power applied in any desired manner.

The operation is as follows:—The tube or sheet to be welded is placed with the portions to be welded on the contacts *c* of the lower electrode arm *b*, the current is turned on and the machine is set in motion. The shaft *e* with its cams works the eccentrics M in such a manner that the point electrodes *c'* successively make a point weld. Owing to the regularity and close arrangement of the electrodes, an approximately continuous seam weld results.

It will be understood that the making and breaking of the circuit may be controlled in any desired way either by hand or automatically under the control of the movable electrodes or work in synchronism with the movement of the electrodes, as this part of the operation is well known in the art. Also it will be understood that the manner of supplying current to the bars *b* and *h* is for the purpose of illustration only and that more than one transformer may be employed and the arrangement may be varied without departing from the spirit of the invention as set forth in the appended claims.

Referring to Fig. 2 the upper movable electrodes, instead of being arranged to be operated in succession throughout the length of the seam to be welded, are arranged in two groups, $c^2$ and $c^3$ and the eccentrics M on the shaft *e* are so disposed as to actuate the first electrodes of each group simultaneously, the second electrode of each group simultaneously and so on throughout the length of the seam. By this arrangement the speed of the welding operation is increased, the arrangement of the circuit remaining as in the case previously described. Obviously the electrodes may be arranged in any desired number of groups, the electrodes of each group being brought into operation successively.

The invention claimed is:—

1. The process of electric welding consisting in arranging the work between a plurality of groups of spot welding electrodes, each group comprising a multiplicity of electrodes arranged in side contact with each other, actuating said electrodes of each group in succession and passing an electric current from one to the other through the work whereby an approximately continuous seam weld is attained.

2. The process of continuous seam welding consisting in locating the work between a multiplicity of pairs of permanently located point electrodes arranged in side contact, maintaining the work stationary during the entire seam welding operation, actuating each pair of electrodes in succession to successively engage different parts of the work, passing an electric current from one electrode of each pair to the other and applying pressure whereby an approximately continuous weld is attained.

3. In an electric welding apparatus, the combination of a plurality of pairs of spot welding electrodes arranged in side contact with each other, means for actuating said electrodes in succession to grip the work between them and means for passing an electric current from one to the other of each pair of electrodes whereby an approximately continuous seam weld is attained.

4. In an electric seam welding apparatus, the combination of a transformer having a terminal for engaging one side of the work to be welded, a plurality of electrodes arranged in side contact and adapted to engage the opposite side of the work and means for actuating said electrodes in succession to effect a continuous seam weld.

5. In an electric seam welding apparatus, the combination of a transformer, bars secured to the terminals of said transformer, one of said bars provided with contacting surfaces for engaging one side of the work to be welded, a plurality of separate movable electrodes arranged in side contact with each other and connected to the other of said bars and means for actuating said electrodes in succession and in predetermined order.

6. In an electric seam welding apparatus wherein the work remains stationary, a transformer, a bar connected to one terminal thereof and provided with stationary work contacting surfaces, a bar connected to the other terminal of said transformer, a plurality of separate, movable electrodes arranged in side contact and passing through said second named bar and means adapted to actuate said electrodes to successively engage parts of the work located between the two said bars.

7. In an electric seam welding apparatus, the combination of a transformer, a pair of parallel bars, one connected to each terminal of said transformer, a plurality of stationary work engaging contacts secured to one of said bars, a plurality of movable, pin-shaped electrodes passing through the other bar and arranged in side contact with each other and means adapted to successively actuate said electrodes to engage the work opposite said stationary contacts.

In testimony whereof I have affixed my signature in presence of two witnesses.

RICHARD MACK.

Witnesses:
JULIUS RUMLAND,
KARL RIEKEBEN.